United States Patent
Klusmeier et al.

(10) Patent No.: US 9,434,286 B2
(45) Date of Patent: Sep. 6, 2016

(54) METHOD FOR PRODUCING A HYBRID CUSHION ELEMENT, IN PARTICULAR A SEAT AND BACKREST CUSHION ELEMENT FOR USE IN A MOTOR VEHICLE, CUSHION ELEMENT AND VEHICLE SEAT HAVING A CUSHION ELEMENT

(75) Inventors: Werner Klusmeier, Lubbecke (DE); Michael Janz, Hullhorst (DE); Andreas Weingartner, Stemwede (DE)

(73) Assignee: Johnson Controls Technology Company, Holland, MI (US)

( * ) Notice: Subject to any disclaimer, the term of this patent is extended or adjusted under 35 U.S.C. 154(b) by 485 days.

(21) Appl. No.: 13/574,832

(22) PCT Filed: Dec. 14, 2010

(86) PCT No.: PCT/EP2010/007603
§ 371 (c)(1),
(2), (4) Date: Apr. 10, 2013

(87) PCT Pub. No.: WO2011/103902
PCT Pub. Date: Sep. 1, 2011

(65) Prior Publication Data
US 2013/0200661 A1    Aug. 8, 2013

(30) Foreign Application Priority Data

Jan. 27, 2010 (DE) .......... 10 2010 005 994

(51) Int. Cl.
*B60N 2/70* (2006.01)
*B29C 70/08* (2006.01)
(Continued)

(52) U.S. Cl.
CPC .............. *B60N 2/70* (2013.01); *B29C 70/088* (2013.01); *B60N 2/448* (2013.01); *B60N 2/4415* (2013.01); *B60N 2/5642* (2013.01); *B60N 2/5685* (2013.01); *B60N 2/7017* (2013.01)

(58) Field of Classification Search
CPC .... B60N 2/70; B60N 2/7017; B60N 2/4415; B60N 2/448; B60N 2/5642; B60N 2/5685; B29C 70/088
USPC ..................................................... 297/452.48
See application file for complete search history.

(56) References Cited

U.S. PATENT DOCUMENTS 3,529,042 A * 9/1970 Lippert ............... C06B 21/0025
149/19.4
3,691,569 A * 9/1972 Ikada ..................... A47C 23/00
277/936

(Continued)

FOREIGN PATENT DOCUMENTS

CN        101550327 A     10/2009
DE          2401375 A1     8/1974
(Continued)

OTHER PUBLICATIONS

PCT International Preliminary Report on Patentability issued Aug. 16, 2012.

(Continued)

*Primary Examiner* — Milton Nelson, Jr.
(74) *Attorney, Agent, or Firm* — Fletcher Yoder, P.C.

(57) ABSTRACT

The invention relates to a hybrid cushion element, in particular a seat cushion element for use in a motor vehicle, to a method for producing a cushion element, and to a vehicle seat, wherein the cushion element has a non-woven fabric layer and a fiber composite material, wherein an insert material is arranged between the non-woven fabric layer and the fiber composite material. During the production in a mold, fibers for the fiber composite material wetted with a binder are applied to the insert material, wherein the insert material and the layer of fibers are then pressed to form a complex molded body, wherein the binder can be cured at a temperature less than 120° C.

16 Claims, 3 Drawing Sheets

Figure 1:
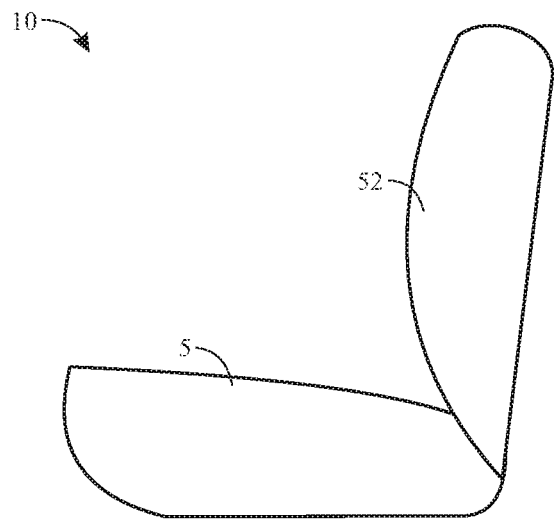

(51) Int. Cl.
*B60N 2/44* (2006.01)
*B60N 2/56* (2006.01)

(56) References Cited

U.S. PATENT DOCUMENTS

| | | | |
|---|---|---|---|
| 4,163,091 A | 7/1979 | Pettelkau et al. | |
| 4,944,992 A * | 7/1990 | Yoneshige | A47C 7/24 297/219.1 |
| 5,543,213 A * | 8/1996 | Duvenkamp | 442/184 |
| 6,083,857 A * | 7/2000 | Bottger et al. | 442/370 |
| 6,340,498 B2 * | 1/2002 | Kirby et al. | 427/220 |
| 2002/0142169 A1* | 10/2002 | Hofacker | C08G 18/6644 428/423.1 |
| 2005/0177950 A1* | 8/2005 | Niederoest | A47C 27/14 5/698 |
| 2009/0176076 A1* | 7/2009 | Ghesquire et al. | 428/215 |

FOREIGN PATENT DOCUMENTS

| | | |
|---|---|---|
| DE | 2652102 A1 | 6/1977 |
| DE | 19628698 C1 | 10/1997 |
| DE | 102008035621 A1 | 11/2009 |
| DK | EP 1166624 A1 * 1/2002 ........... A01G 31/001 |  |
| GB | 837589 A | 6/1960 |
| GB | 880554 A | 10/1961 |
| JP | H0330609 B2 | 5/1991 |
| JP | H07196764 A | 8/1995 |
| JP | H093423 | 1/1997 |
| JP | H10279791 | 10/1998 |
| JP | 2001303393 | 10/2001 |
| JP | 2005-000192 | 1/2005 |
| JP | 2006-225771 | 8/2006 |
| JP | 2006-320516 | 11/2006 |
| JP | 2007082701 | 4/2007 |
| JP | 2007211075 A | 8/2007 |
| JP | 2008-81741 A | 4/2008 |
| JP | 2008534189 | 8/2008 |
| WO | 9958590 | 11/1999 |
| WO | 2004082989 | 9/2004 |
| WO | 2006105874 A1 | 10/2006 |
| WO | 2010012469 A2 | 2/2010 |

OTHER PUBLICATIONS

International Search Report for application No. PCT/EP2010/007603 mailed Mar. 14, 2011.
Chinese Office Action dated Feb. 10, 2015, pp. 1-8.
Japanese Examination Report dated Oct. 8, 2013.
Japanese Examination Report dated Jul. 15, 2015 and mailed Jul. 21, 2015.
JP Application No. 2012-550324 Office Action Mailed Jun. 7, 2016; 4 Pages.
Adhesion Society of Japan, "Adhesion technique manual for a person who aims to be professional," first edition, Nikkan Kogyo Shimbun, Ltd., Jun. 30, 2009, pp. 75-82.
Adhesion Society of Japan, "Adhesion handbook (second edition)," Nikkan Kogyo Shimbun, Ltd., Aug. 23, 1991 (second edition, eighth print), pp. 474-483.

* cited by examiner

METHOD FOR PRODUCING A HYBRID CUSHION ELEMENT, IN PARTICULAR A SEAT AND BACKREST CUSHION ELEMENT FOR USE IN A MOTOR VEHICLE, CUSHION ELEMENT AND VEHICLE SEAT HAVING A CUSHION ELEMENT

CROSS REFERENCE TO RELATED APPLICATIONS

This application claims priority from and the benefit of PCT Application No. PCT/EP2010/007603, filed on Dec. 14, 2010 and German Patent DE 10 2010 005 994.3, filed on Jan. 27, 2010; all entitled "Method for Producing a Hybrid Cushion Element, In Particular a Seat and Backrest Cushion Element for Use In a Motor Vehicle, Cushion Element and Vehicle Seat Having a Cushion Element", which are herein incorporated by reference.

BACKGROUND

The invention relates to a method for producing a cushion element or a cushion support essentially made of a cushion material, preferably a fiber composite material, in particular a cushion support for a motor vehicle seat. The cushion element comprises in particular a cushion element or a cushion support for a seat part and a cushion element or a cushion support for a backrest part in this case, wherein the cushion element covers the carrier structure of the seat made of metal or plastic to increase the seat comfort. Furthermore, the invention relates to a cushion element and a vehicle seat having a cushion element.

Over 90% of the cushion supports for seats and backrests in the furniture and automobile fields consist of polyurethane soft foam (PUR soft foam). The main reason for the above-average presence of polyurethane soft foam in cushion supports is founded in the comparatively low price of the final product. These cushion supports made of PUR foam have the disadvantage that the seat climate is comparatively poor. With the same contour and same construction, because of the reworking such as stamping and grinding, the cushion support is more costly upon the use of fibers. However, the fiber component always has the advantage of the better seat climate.

Various methods for producing such cushion supports from fiber composite material—for example, from coconut fibers and latex as the binder—for a motor vehicle seat are known from the prior art.

In the so-called rubberized fiber method, piles made of fibers and the binder latex are first laid. Blanks are stamped out of the piles, which are sprayed once again with latex and subsequently manually laid or installed in tools. Hot air heated to approximately 120° C. is conducted through the tools, so that the latex/fiber mixture dries in the tool, after which the molded and dried cushion part is removed from the tool. The cushion part must then be cut or stamped. Subsequently, the burr arising upon the cutting or upon the stamping is removed by manual grinding. The last work step is the vulcanization of the parts in an autoclave, wherein the vulcanization can also frequently occur directly after the demolding of the cushion supports. These processing steps can be switched around depending on the contour and geometry of the part. The cushion supports can then typically also be finished further, in that specific regions can be laminated with foam or also with fleece. This method has the disadvantage that it is comparatively complex and costly.

A further mass production method—known under the name "FaserTec"—is distinguished in that piles do not have to be manufactured using a laying machine, but rather the fibers are scattered with the binder (e.g., latex) directly through a scattering head into tools. Through this improvement of the method, the laying process can be omitted, however, all downstream mechanical interventions such as cutting, stamping, or grinding are still indispensable individually or in combination. In the FaserTec method, the tools are typically arranged on round tables having four or five tools. The main processes of this arrangement are the scattering of the fibers and the binder in the tool and the drying procedure. The parts are subsequently cut and/or stamped, ground, and vulcanized as in the classical rubberized fiber method. This method has the disadvantage that it is comparatively complex and costly.

As a supplement to the described rubberized fiber and FaserTec methods, which are found in mass production, there are still further developments of methods which have polyester fibers as the base material. These include the so-called Neocurle method, in which polyether sulfone or polyethylene terephthalate fibers (in short: PESIPET fibers) are wetted using a binder such as PUR and subsequently the cushion part reacts completely in a tumbling tool. This procedure is very complex and costly.

SUMMARY

The invention is based on the problem of avoiding the disadvantages applicable for cushion elements produced according to the abovementioned methods.

The problem is solved according to the invention by a cushion element, in particular a seat and backrest cushion element for use in a motor vehicle, wherein the cushion element comprises a fleece layer and a fiber composite material, wherein an inlay material is arranged between the fleece layer and the fiber composite material, wherein the fiber composite material comprises a binder, wherein the binder is curable at a temperature less than 120° C. This temperature is therefore significantly below the curing temperature of a natural latex binder. The dwell time of the part in the tool is substantially reduced by the low level of drying. The individual inlaid materials are not subjected to warmth/heat as long.

The cushion element according to the invention has the advantage over the prior art that it is possible to use not only fibers or fiber mats as the additional inlay components, but rather in addition also inlays made of other materials, e.g., PUR molded and cut foam, technical textiles, odor-preventing activated carbon mats, dynamic driving modules, or hollow bodies for cable and air guides. Vulcanization and intensive drying of the binder are not necessary, so that it is possible to inlay inlays during the production, without the inlaid materials suffering damage due to the high temperature and the high level of moisture. A binder based on polyurethane or based on chloroprene is preferably used as the binder.

Furthermore, it is preferable for the binder to be curable at a temperature less than 100° C., furthermore, it is preferable for the binder to be curable at a temperature less than 80° C., furthermore, it is preferable for the binder to be curable at a temperature less than 60° C., furthermore, it is preferable for the binder to be curable at a temperature less than 40° C., furthermore, it is preferable for the binder to be curable at a temperature less than 30° C., furthermore, it is preferable for the binder to be curable at a temperature less than 25° C., furthermore, it is preferable for the binder to be curable at a temperature less than 15° C., furthermore, it is preferable for the binder to be curable at a temperature less than 5° C. It is thus advantageously possible to inlay inlays during the production, without the inlaid materials suffering damage due to the high temperature and the high level of moisture. In particular, by dispensing with the vulcanization at high temperature and high pressure, the inlaid materials are treated comparatively more carefully.

Furthermore, it is preferable according to the invention for the inlay material to be a fleece or a mat, wherein the fleece or the mat comprises natural or synthetic fibers. A great manifold of different materials is thus usable with the method according to the invention for generating different comfort claims or applications, for example, PES/PET (polyethylene terephthalate)/PLA (polylactide) fibers.

Furthermore, it is preferable according to the invention if the inlay material is softer than the fiber composite material. A particularly soft seating behavior of the cushion body according to the invention can thus be implemented in a simple manner.

Furthermore, it is also preferable according to the invention for the fiber composite material to comprise fibers, wherein the fibers are coconut fibers in particular. It is thus possible in a particularly advantageous manner that the cushion part according to the invention is particularly well suitable for very good active and passive ventilation.

Furthermore, it is also preferable according to the invention for the inlay material to be an industrially produced woven or spun fleece. According to the invention, the cushion element can thus be produced particularly variably and cost-effectively in an advantageous manner.

Furthermore, it is preferable according to the invention for the inlay material to have a lower specific weight than the fiber composite material. A particularly light cushion element can thus be implemented in a particularly simple and cost-effective manner.

Furthermore, it is preferable according to the invention for the inlay material to comprise a polyurethane material. Through the use of a PUR soft foam blank, it is advantageously possible that a particularly soft seating behavior can be achieved. Furthermore, the inlay material preferably comprises a perforated polyurethane material, whereby comparatively very good active and passive ventilation can advantageously be achieved.

Furthermore, it is preferable according to the invention for the inlay material to comprise an activated carbon mat. Odor reduction and absorption of pollutants in the automobile interior are advantageously possible through the use of an activated carbon mat.

Furthermore, it is preferable according to the invention for the inlay material to comprise an inflatable air cushion. Through the use of an inflatable air cushion, simple and cost-effective integration of massage modules, which massage the muscles of the seat user during sitting, is advantageously possible, so that the seat comfort can be significantly increased.

Furthermore, it is preferable according to the invention for the inlay material to comprise a heating wire. Through the integration of a heating wire or preferably a heating pad, which comprises a plurality of heating wires, it is advantageously possible in a simple and cost-effective manner that the seat comfort can be significantly increased.

Furthermore, it is preferable according to the invention for the inlay material to be provided only extending over a subregion of the surface of the cushion element, or for at least two different inlay materials to be provided, wherein the at least two different inlay materials are arranged in different surface regions of the cushion element. According to the invention, it is thus advantageously possible that not all surface zones are occupied by the inlay material or that various surface zones can be implemented in the cushion element, so that the usage comfort can be increased once again with a very low additional expenditure.

A further object of the present invention relates to a method for producing a cushion element according to the invention in particular, wherein a precursor material comprising an inlay material is molded in a molding tool. It is thus advantageously possible according to the invention to produce the cushion element particularly cost-effectively.

A further object of the present invention relates to a vehicle seat, in particular for a motor vehicle, comprising a seat part and a backrest part, wherein the seat part and/or the backrest part comprises a cushion element according to the invention.

DRAWINGS

Embodiments of the invention are shown in the drawing and explained in greater detail in the following description.

FIG. 1 schematically shows a vehicle seat according to the invention having a seat part and a backrest part in a side view.

FIGS. 2a to 2d each show one of four manufacturing steps of an embodiment of the method according to the invention.

Figure 3:
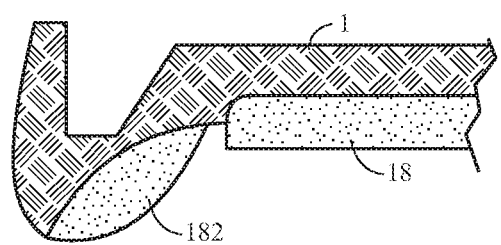
Figure 4:
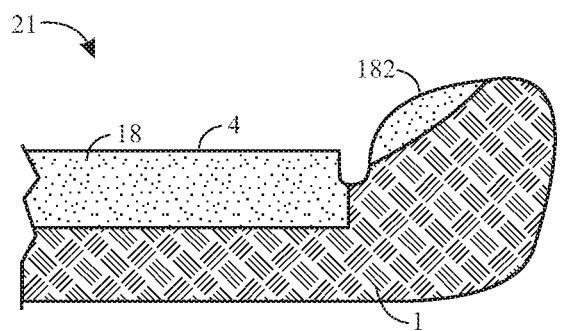

FIGS. 3 and 4 each schematically show one embodiment of a cushion element according to the invention of a vehicle seat, in particular either the seat part or the backrest part, in a schematic sectional view.

DETAILED DESCRIPTION

FIG. 1 schematically shows a vehicle seat 10 according to the invention in a side view. The vehicle seat 10 has a seat part 5 and a backrest part 52, each having a cushion or a seat cushion element 21, respectively, which covers the carrier structure of the seat part or backrest part made of metal or plastic, and which is used to elevate the seat comfort.

Figure 2A:
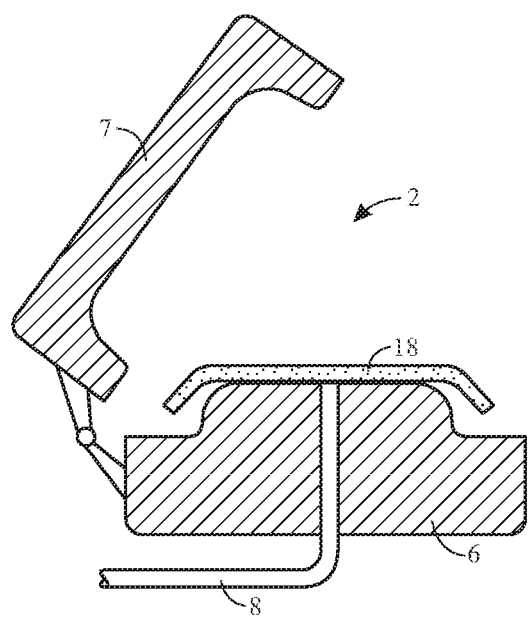
Figure 2B:
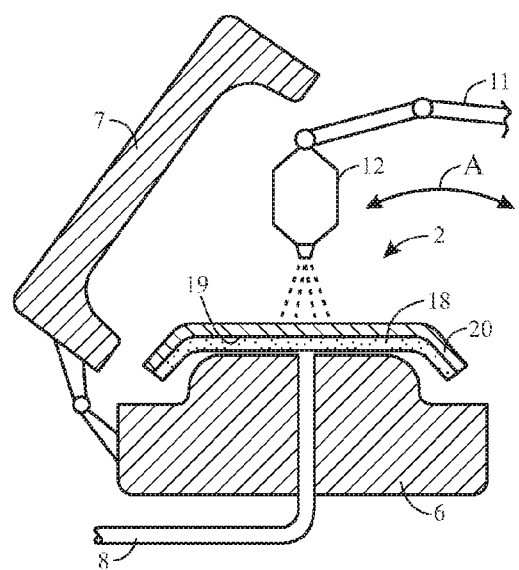
Figure 2C:
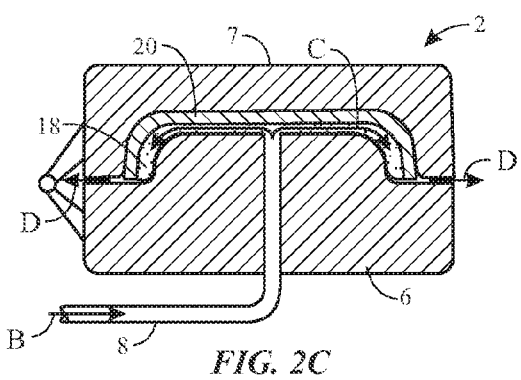
Figure 2D:
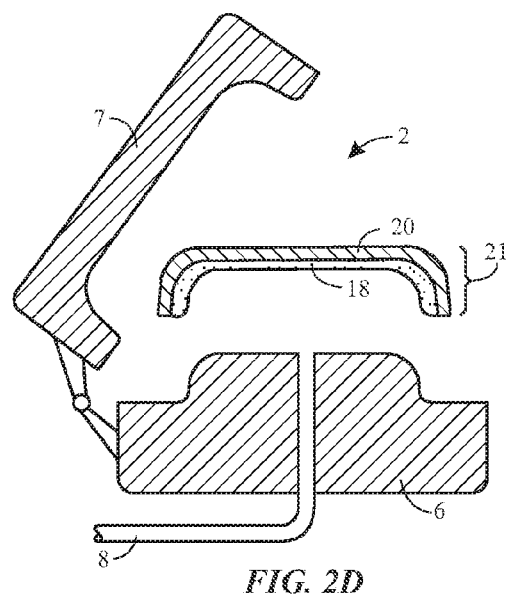

FIG. 2a to FIG. 2d schematically show that when the method according to the invention is carried out, first a blank of the inlay material 18 is laid on the lower tool 6. This procedure can be performed manually or automatically (FIG. 2a). Subsequently, as shown in FIG. 2b, the binder-containing emulsion and the fibers are applied to the inlay material 18 by means of the spray head 12 in such a manner that a relatively thick, tangled layer 20 of fibers wetted with binder is formed on its surface 19. The pivot movements of the spray head 12 are indicated by the arrow A. By closing the tool (FIG. 2b), the inlay material 18 and the layer 20 are compressed to form a complex molded body (FIG. 2c). Slides (not shown) in the tool 2 can reshape or compact regions of the molded body in a special manner. Undercut components can thus also be produced. The drying air (arrow B) supplied via the air duct 8 into the lower tool 6 can be distributed in the inlay material 18 parallel to its flat sides (indicated by arrows C), and can escape outward (indicated by arrow D) in the area of the partition between lower and upper tools 6, 7 and through ventilation holes (not shown) in the upper tool 7. A sufficient amount of water is withdrawn from the sprayed-on emulsion by the drying air that the layer 20 dries into a molded body which is elastic, but is dimensionally stable, and which is bonded to the inlay material 18 via the binder without further measures. The tangled fibers are spaced apart from one another so that the layer 20 is also permeable to air, even if its flow resistance (considered in the case of flow parallel to the flat side) is significantly greater than within the inlay material 18. As shown in FIG. 2d, the cushion element 21 thus resulting can be removed after the opening of the tool 2. Subsequent vulcanization is no longer necessary.

FIGS. 3 and 4 each schematically show one embodiment of a cushion element 21 according to the invention of a vehicle seat 10 for the seat part or the backrest part 5, 52, respectively, in a sectional view. The cushion element 21 comprises a fiber composite material 1 and a fleece layer 4. The fleece layer 4 is, for example, fiber fleece based on natural or synthetic material. An inlay material 18, 182 is arranged on the side of the fleece layer 4 facing toward the fiber composite material 1 in the cushion element 21 according to the invention.

In this case, the fiber composite material 1 comprises in particular a fiber material having a contour-determining strength and a binder. For example, synthetic fibers (PES, PET, PLA) and/or natural fibers (e.g., coconut fibers) are used as the fibers. A binder which is curable at a temperature less than 120° C. is used as the binder. For example, this is a binder based on polyurethane or chloroprene. The inlay materials 18, 182 particularly have various settable properties, whereby greatly varying configurations of the cushion element 21 are implementable.

The invention claimed is:

1. A cushion element for use in a motor vehicle, the cushion element comprising a fleece layer, an elastic fiber composite material, and an inlay material arranged between the fleece layer and the elastic fiber composite material, wherein the elastic fiber composite material comprises a polyurethane-based or chloroprene-based binder curable at a temperature less than 120° C.;

wherein the elastic fiber composite material comprises tangled fibers wetted with the polyurethane-based or chloroprene-based binder, the polyurethane-based or chloroprene-based binder is curable by removing water without vulcanization, and the tangled fibers are spaced apart from one another by removing the water.

2. The cushion element as claimed in claim 1, wherein the polyurethane-based or chloroprene-based binder is curable at a temperature less than 100° C.

3. The cushion element as claimed in claim 1, wherein the inlay material has a lower specific weight than the elastic fiber composite material.

4. The cushion element as claimed in claim 1, wherein the inlay material comprises a flatly arranged polyurethane material.

5. The cushion element as claimed in claim 1, wherein the inlay material comprises a flatly arranged perforated polyurethane material.

6. The cushion element as claimed in claim 1, wherein the inlay material comprises an activated carbon mat.

7. The cushion element as claimed in claim 1, wherein the inlay material comprises an inflatable air cushion.

8. The cushion element as claimed in claim 1, wherein the inlay material comprises a heating wire.

9. The cushion element as claimed in claim 1, wherein the polyurethane-based or chloroprene-based binder is curable at a temperature less than 5° C.

10. A vehicle seat comprising a seat part and a backrest part, wherein the seat part and/or the backrest part comprises the cushion element as claimed in claim 1.

11. The cushion element as claimed in claim 1, wherein the polyurethane-based or chloroprene-based binder is curable at a temperature less than 80° C.

12. The cushion element as claimed in claim 1, wherein the polyurethane-based or chloroprene-based binder is curable at a temperature less than 60° C.

13. The cushion element as claimed in claim 1, wherein the polyurethane-based or chloroprene-based binder is curable at a temperature less than 40° C.

14. The cushion element as claimed in claim 1, wherein the polyurethane-based or chloroprene-based binder is curable at a temperature less than 30° C.

15. The cushion element as claimed in claim 1, wherein the polyurethane-based or chloroprene-based binder is curable at a temperature less than 25° C.

16. The cushion element as claimed in claim 1, wherein the polyurethane-based or chloroprene-based binder is curable at a temperature less than 15° C.

* * * * *